US007788181B2

(12) United States Patent
Ben-Menahem et al.

(10) Patent No.: US 7,788,181 B2
(45) Date of Patent: Aug. 31, 2010

(54) SOFTWARE LICENSING USING CERTIFICATE ISSUED BY AUTHORIZED AUTHORITY

(75) Inventors: Avi Ben-Menahem, Sammamish, WA (US); Nir Ben-Zvi, Redmond, WA (US); Ronald W. Miller, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 11/319,151

(22) Filed: Dec. 27, 2005

(65) Prior Publication Data
US 2007/0150418 A1    Jun. 28, 2007

(51) Int. Cl.
*G06F 21/00* (2006.01)
*H04L 29/06* (2006.01)

(52) U.S. Cl. .............................. 705/59; 705/51; 705/54; 705/55; 705/57; 705/902; 713/155; 713/156; 713/157; 713/175; 713/173; 726/26; 726/27

(58) Field of Classification Search ............ 705/50–79; 713/155–159, 168–181; 726/26–30
See application file for complete search history.

(56) References Cited

U.S. PATENT DOCUMENTS

| | | | | | |
|---|---|---|---|---|---|
| 5,204,897 | A | * | 4/1993 | Wyman ...................... | 710/200 |
| 5,671,412 | A | * | 9/1997 | Christiano ................... | 1/1 |
| 5,758,069 | A | * | 5/1998 | Olsen ......................... | 726/27 |
| 5,825,877 | A | * | 10/1998 | Dan et al. ................... | 705/54 |
| 5,864,620 | A | * | 1/1999 | Pettitt ......................... | 705/54 |
| 5,892,900 | A | * | 4/1999 | Ginter et al. ................ | 726/26 |
| 5,978,484 | A | * | 11/1999 | Apperson et al. ........... | 705/54 |
| 6,047,242 | A | * | 4/2000 | Benson ....................... | 702/35 |
| 6,226,618 | B1 | * | 5/2001 | Downs et al. ............... | 705/1 |
| 6,314,408 | B1 | * | 11/2001 | Salas et al. ................. | 705/54 |
| 6,334,189 | B1 | * | 12/2001 | Granger et al. ............. | 726/26 |
| 6,658,568 | B1 | * | 12/2003 | Ginter et al. ................ | 713/193 |
| 6,772,340 | B1 | * | 8/2004 | Peinado et al. ............. | 713/168 |
| 6,920,567 | B1 | * | 7/2005 | Doherty et al. ............. | 726/22 |
| 7,171,662 | B1 | * | 1/2007 | Misra et al. ................ | 717/177 |
| 7,415,721 | B2 | * | 8/2008 | Fransdonk .................. | 726/4 |
| 2002/0019938 | A1 | * | 2/2002 | Aarons ...................... | 713/168 |
| 2002/0112179 | A1 | * | 8/2002 | Riordan et al. ............. | 713/200 |
| 2002/0138441 | A1 | * | 9/2002 | Lopatic ...................... | 705/59 |
| 2003/0217011 | A1 | * | 11/2003 | Peinado et al. ............. | 705/59 |
| 2004/0148344 | A1 | * | 7/2004 | Navar et al. ................ | 709/203 |

(Continued)

OTHER PUBLICATIONS

Randall K, Nichols, "ICSA Guide to Cryptography", Copyright 1999 by The McGraw-Hill Companies, Inc.*

*Primary Examiner*—Calvin L Hewitt, II
*Assistant Examiner*—Steven Kim
(74) *Attorney, Agent, or Firm*—Woodcock Washburn LLP

(57) ABSTRACT

Software is governed by a digital license that specifies a certificate that must be present in order for the software (or certain features thereof) to be used. A root authority authorizes a license server to issue certificates that are called for in the digital license for an item of software. The software and the digital license are installed on a machine, and the machine enrolls with the license server to obtain the certificate. When the software is run, an enforcement component evaluates the license to determine what certificate is required, and then evaluates the certificate to determine whether it meets the requirements of a license. If the certificate is invalid, the enforcement component may disable the software, or may disable certain features of the software.

18 Claims, 4 Drawing Sheets

U.S. PATENT DOCUMENTS

| | | | |
|---|---|---|---|
| 2004/0168077 A1* | 8/2004 | Waxman et al. | 713/200 |
| 2005/0187879 A1* | 8/2005 | Zigmond et al. | 705/59 |
| 2005/0289068 A1* | 12/2005 | Stefik et al. | 705/51 |
| 2006/0026105 A1* | 2/2006 | Endoh | 705/59 |
| 2006/0064582 A1* | 3/2006 | Teal et al. | 713/156 |
| 2006/0064756 A1* | 3/2006 | Ebert | 726/26 |

* cited by examiner

SOFTWARE LICENSING USING CERTIFICATE ISSUED BY AUTHORIZED AUTHORITY

BACKGROUND

Software is normally distributed subject to the terms of a license. When software is installed on a computer, it is possible for the software to contain, or to work with, a system that assists in enforcing the terms of the license. An "activation" system is an example of a system that assists with license enforcement. In an activation system, software is distributed with a client-side enforcement component that can cause the software to operate with greater or lesser numbers of its features enabled (or to operate for a limited time, or to operate with some arbitrary set of restrictions). (Software with the greater number of features enabled can be said to operate in "full-featured" mode, while the same software with the lesser number of features enabled can be said to operate in "limited" mode.) For a user to be permitted to use the greater number of features, it is normally necessary for a user to activate the software, and the activation process is designed to detect when a given copy of the software has been installed on a greater number of machines than the license permits (and/or to perform other tests to determine whether a given copy of the software is legitimate). When the activation process detects that the software has been installed on a greater number of machines than the license permits (or whether the circumstances surrounding the activation otherwise suggest that the installation being activated is not legitimate), activation will be denied, and the client-side enforcement component will cause the software to run with only a limited set of features enabled, or may disable use of the software entirely.

As can be appreciated by the limitations of the conventional activation systems, activation systems are most effective at enforcing licensing terms when the term that is being enforced is a simple limit on the number of machines on which a given piece of software can be installed, and where the software is sold directly to the user. However, it would be beneficial in an enterprise licensing situation—where an organization has purchased the right to install software on a certain number of machines—to enforce the condition that the software be installed on machines that are legitimately part of the organization. Additionally, it would be beneficial that when machines are not longer in use, or their owners have left the organization, to revoke usage of the software that has been installed on these machines. Therefore, based upon the limitations of the conventional activation systems, it is desirable for an enforcement component to be able to support these usage scenarios.

SUMMARY

Software is installed on one or more machines, along with an enforcement component that determines whether the software is permitted to operate in a full-featured time-limited mode or a feature-limited mode, or a full-featured time-unlimited (aka activated) mode. Also installed on the one or more machines is a license that identifies a certificate that is to be present in order to permit the software to operate in full-featured mode. The license typically identifies the certificate by specifying the authority that must issue the certificate. For example, if the software is licensed to the XYZ Corp. for installation on XYZ Corp.'s computers, then the license may specify that, in order to permit operation in full-featured mode, a certificate issued by XYZ Corp.'s certificate authority (or issued by a server that roots to XYZ Corp.'s certificate authority) needs to be present on the machine on which the software is running. Other features are described below.

DETAILED DESCRIPTION

Overview

In one example scenario, a license agreement permits a given entity to install software on one or more machines. An example of such a scenario is an enterprising licensing situation, in which a corporation purchases a license that entitles the corporation to install software on all of the machines (or a certain number of machines) that are used by the corporation. In such an example scenario, the software is installed on a machine along with license data that specifies a certificate that is to be present in order for the software to operate in full-featured mode.

The software is accompanied by an enforcement component that can enable or disable certain features of the software, or the entire software. The enforcement component makes a determination as to whether to enable or disable the features or the software. The enforcement component evaluates the license data to determine what certificate is required, and then determines whether the certificate is present. The enforcement component either enables or disables the features or the software depending on whether the certificate is present. The license can identify the needed certificate by specifying which entity must sign the certificate in order for the certificate to be considered acceptable. Normally, the signing entity will be the certificate authority of the licensee's domain—e.g., if the software is licensed to XYZ Corp., then the license will specify that the certificate is to be signed by the certificate authority of the XYZ Corp.'s domain.

Example Computing Arrangement

Figure 1:
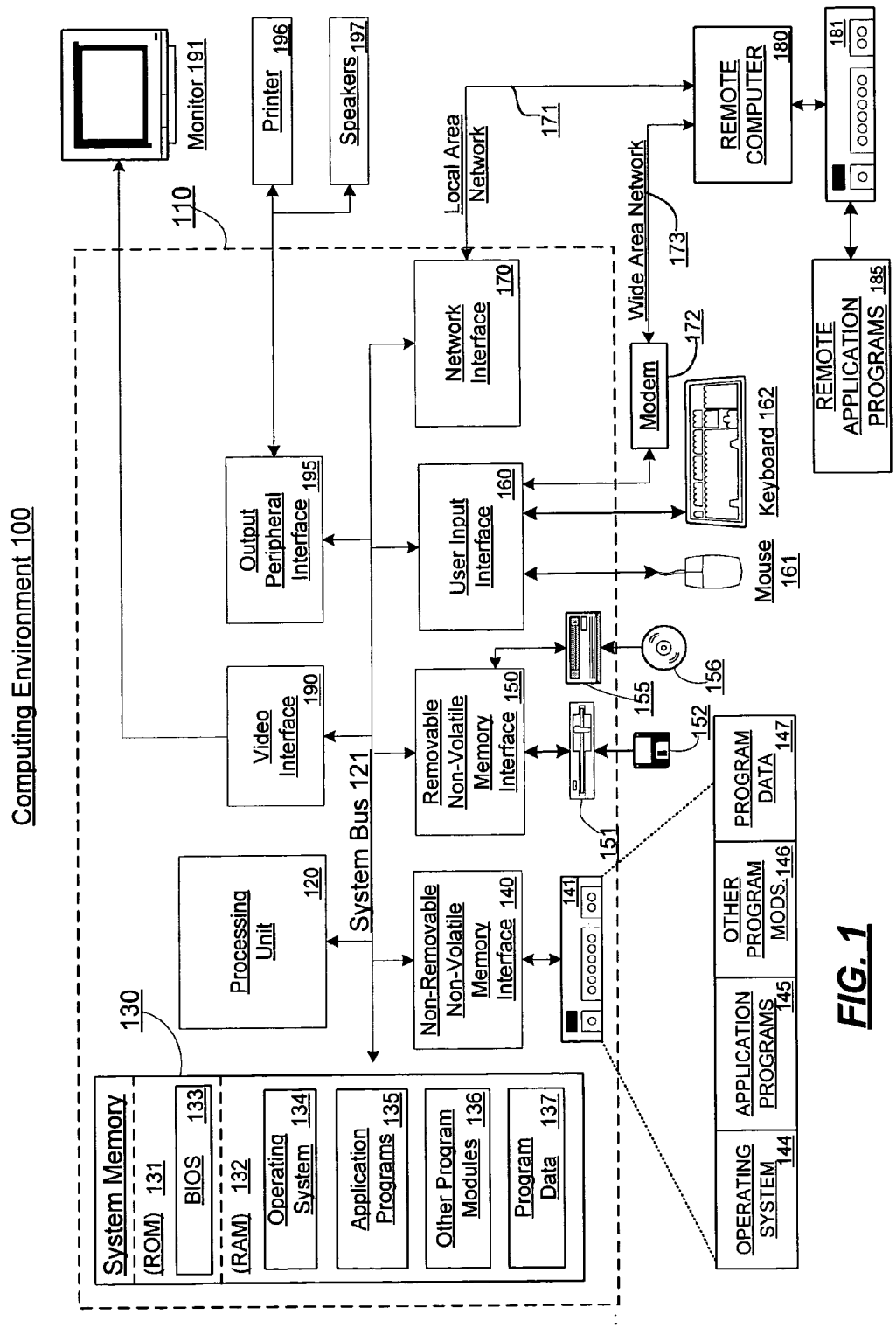
FIG. 1 is a block diagram of an example computing environment in which example embodiments and aspects may be implemented.

FIG. 1 shows an example computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, cell phones, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

License Enforcement

Figure 2:
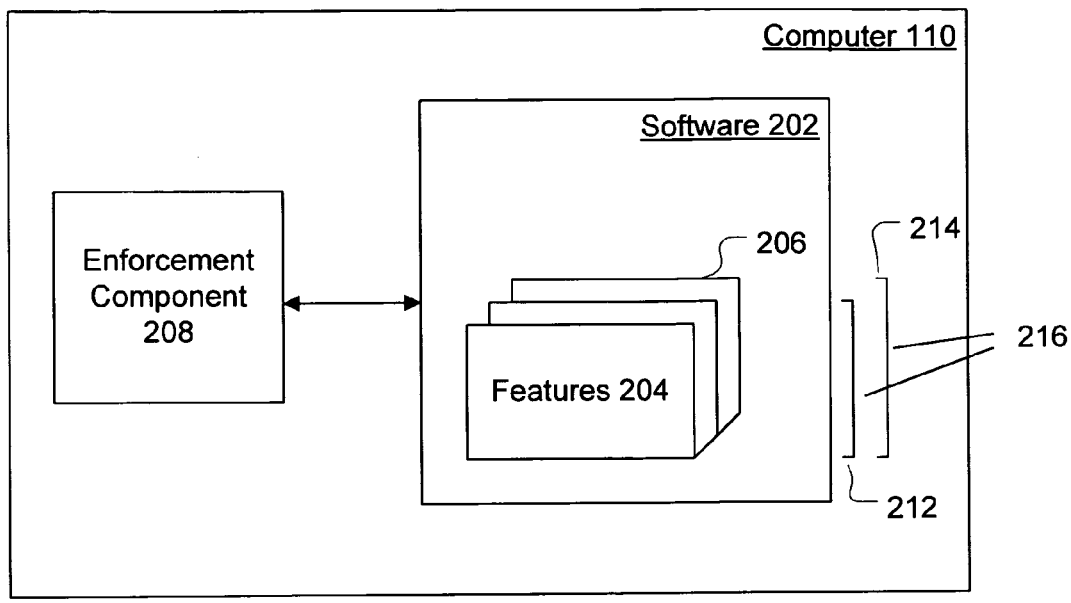
FIG. 2 is a block diagram of an example enforcement component that interacts with software.

Referring to FIG. 2, an item of software 202 may be installed on a computer 110. Software 202 may comprise an operating system, an application program, or any other type of software.

Software 202 comprises one or more features 204, which represent the various functionalities of software 202. The nature of features 204 can differ depending on the nature of software 202. For example, if software 202 is a word processor or office suite, then features 204 may include the ability to edit documents, save documents, print documents, etc. On the other hand, if software 202 is an operating system, then features 204 may include the ability to log in, to execute certain device drivers, or to communicate via a network.

Enforcement component 208 interacts with software 202, and can enable or disable certain features 204. Enforcement component 208 enables or disables certain features in support of a particular licensing model under which software 202 is licensed. For example, software 202 may require "activation" in order to permit use of its full set of features 204, in which case enforcement component 208 can enable or disable features 204 (or a particular subset of one or more features, such as feature 206) depending on whether software 202 is activated (and/or based on other conditions, such as whether unactivated software is within a pre-activation grace period). For example, if software 202 is a word processor and feature 206 is the ability to save documents, enforcement component 208 can disable feature 206 if software 202 has not been activated and is beyond any applicable pre-activation grace period. As another example, if software 202 is an operating system and feature 206 is the ability to log in, then enforcement component 208 can disable the ability to log in (thereby requiring the user to either activate or to use the operating system in a non-login "safe mode"), if software 202 is unactivated and is beyond any applicable grace period. (Software that normally requires activation in order to enable certain features may have a grace period during which the features are available prior to activation; such a grace period can be defined, for example, in terms of a number of days following installation of the software (e.g., 30 days), or in terms of a number of start-ups following installation (e.g., 50 start-ups).)

Enforcement component 208 can make the determination about whether to enable or disable one or more of features 204 based on certain conditions. Examples of these conditions are more particularly described below in connection with FIG. 3.

While it is possible that features 204 can be individually enabled or disabled by enforcement component 208, in a typical embodiment software 202 operates in a plurality of modes 216, such as limited mode 212 or full-featured mode 214. In the example of FIG. 2, limited mode 212 means that some of features 204 are enabled (e.g., limited mode may mean that all of the features except for feature 206 are enabled), and full-featured mode 214 means that all of features 204 are enabled (or, at least, that some feature is available in full-featured mode that is not available in limited mode). It may be convenient to regard software 202 as operating in one of several modes 216, where a mode is characterized by which ones of features 204 are available.

One example of a situation that may employ an enforcement component 208 in connection with software 202 is Microsoft's Product Activation system, which is used with certain Microsoft software products. For example, in the Product Activation system used with certain versions of the MICROSOFT WINDOWS operating system, an enforcement component may require the presence of an activation certificate in order to permit a user to log in, if the particular installation of the operating system is beyond a grace period, or a certain number of start-ups since the time the software was installed). In this case, the ability to log in corresponds to feature 206 in FIG. 2, and the enforcement component can disable this feature 206. Similarly, in the MICROSOFT OFFICE application software suite (with which Product Activation may also be used), feature 206 may correspond to the ability to save a document, and an enforcement component may disable this feature if the software has not been activated and is beyond its applicable grace period. While Microsoft Product Activation system is an example of a scenario in which an enforcement component may be used, it will be understood that the system described herein is not limited to any particular commercial system or product.

Figure 3:
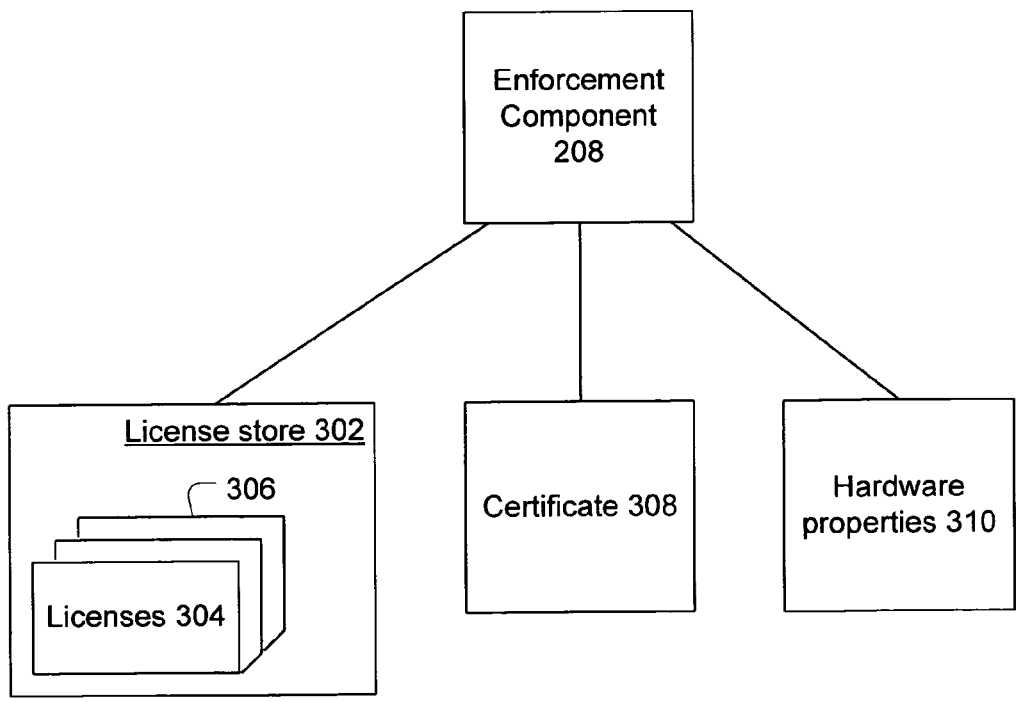
FIG. 3 is a block diagram of the example enforcement component shown in FIG. 2, and various example types of information used by said enforcement component.

FIG. 3 shows enforcement component 208, together with various example types of information that enforcement component 208 may rely on to make decisions about whether to enable or disable all or some of features 204 (shown in FIG. 2). For example, enforcement component may have access to a license store 302, which stores one or more licenses 304. Additionally, enforcement component 208 may be able to evaluate a certificate 308, and certain hardware parameters of the particular machine (e.g., computer 110, shown in FIG. 2) on which enforcement component 208 and software 202 (shown in FIG. 2) are running. (Enforcement component 208 can also evaluate various other information, such as a Certificate Revocation List (CRL) to determine whether the certificate 308 and/or the certificate authority that issued certificate 308 continues to be valid.) Typically, license store 302 and certificate 308 are located on computer 110. Additionally, hardware parameters 310 typically relate to computer 110 (e.g., hardware parameters 310 may comprise, or be based on, the serial number of the computer's processor and/or hard disk, the size of the memory, etc.). Hardware parameters 310 may assist in probabilistically distinguishing one computer from another, although hardware parameters 310 do not necessarily uniquely identify a particular computer.

Enforcement component 208 can use the various types of information accessible to it in order to make decisions about whether to enable or disable certain software features. For example, prior to enabling a particular feature of software (or prior to enabling the entire piece of software), enforcement component 208 may require the presence of a valid license (e.g., license 306, which is one of licenses 304) on the machine on which the software is running. As another example, license 306 may be bound to a specific machine by specifying a particular set of hardware parameters; in this case, enforcement component 208 may require, prior to enabling the software or certain features thereof, that the machine on which enforcement component 208 is running actually has the hardware parameters 310 specified in license 306. (Alternatively, enforcement component 208 may allow the hardware parameters 310 specified in the license and the hardware parameters of the machine on which enforcement component 208 is running to differ within some defined limit of tolerance—e.g., if the hardware parameters 310 are composed of, say, ten fields representing the processor serial number, the hard disk serial number, the address of the network adapter, the size of the memory, etc., then enforcement component 208 may accept the license as valid even if the hardware parameters differ in, say, up to three fields.)

As another example, license 306 may specify a certificate 308 that should be present before enabling use of the software or certain features. For example, license 306 may specify that a certificate issued by the XYZ Corp.'s license server is to be present, in which case enforcement component 208 will check for the presence of a certificate digitally signed by that license server before enabling the use of the software (or certain features of the software). (The "presence" of a certificate can take various forms. By way of example and not limitation, the certificate can be present if it is stored on a computer's hard disk, or if it is stored on a removable medium (e.g., removable disk, removable card, etc.) that has been inserted into (or placed into usable communication with) the user's computer.) In this case, determining whether to enable the software or features is essentially a two step process: enforcement component 208 evaluates the license and determines what certificate is required; then, enforcement component 208 evaluates the certificate to determine whether it complies with the requirements specified in the license. (The above mentioned hardware parameters 310 may, in one example, be part of certificate 308, in which case it is the certificate, rather than the license, that is bound to a particular machine. Additionally, it should be noted that the proper certificate does not necessarily have to be issued by the entity (e.g., XYZ Corp.) that has licensed the software; in a different example, the certificates could be issued by the software manufacturer itself, which might, for example, limit the number of certificates based on the number of installations that the licensee has licensed.)

Figure 4:
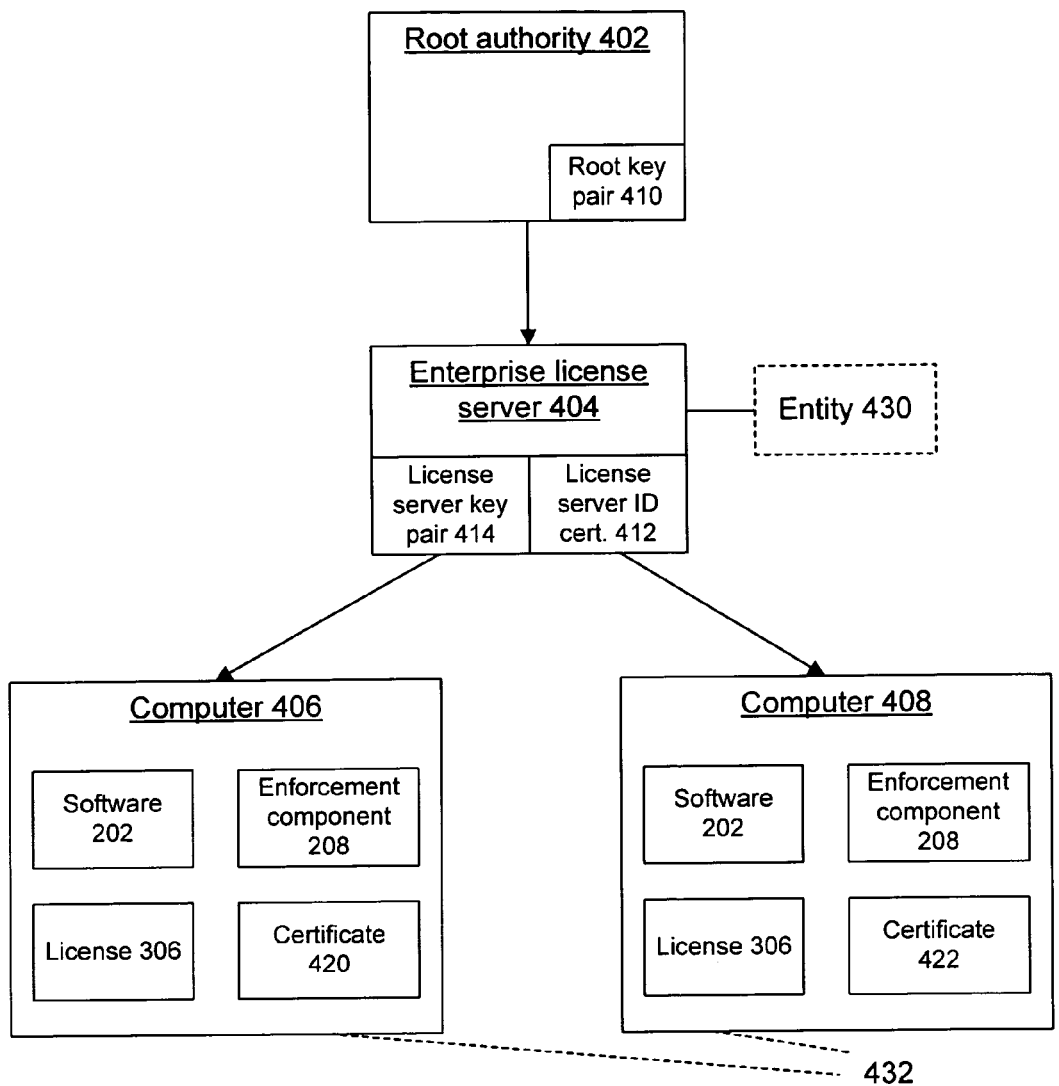
FIG. 4 is a block diagram of an example arrangement having a root authority, a license server, and a plurality of computers.

FIG. 4 shows how the use of certificates can be deployed in an example scenario. In the scenario of FIG. 4, software 202 is a program that is to be installed on one or more computers 432 (e.g., workstations, laptops, servers, etc.) within a particular enterprise. (In FIG. 4, the one or more computers 432 are shown, by way of example, as computers 406 and 408, although it will be understood that the embodiments described herein are not limited to any particular number of computers. Additionally, it should be understood that computers 432 may, for example, be instances of computer 110 shown in FIG. 1, although computers 432 are not limited to any particular type of computer.) On each of computers 406 and 408, an instance of software 202 is installed. Also on computers 406 and 408, an instance of license 306 is installed. Software 202 and license 306 may, for example, be installed from a medium (or collection of media) that the enterprise obtained from the manufacturer and/or licensor of software 202. Also installed on computers 406 and 408 are instances of enforcement component 208, which operates in the manner described above in connection with FIGS. 2 and 3. License 306 specifies that a certificate issued by enterprise license server 404 is required to enable certain features of software 202.

The authority of enterprise license server 404 to issue certificates derives either from enterprise license server 404 being specified in license 306, or by virtue of the fact that enterprise license server can trace its chain of authority back to some root authority 402 that is specified in license 306.

The authority of enterprise license server 404 to issue certificates derives either from enterprise license server 404 being specified in license 306, or by virtue of the fact that enterprise license server can trace its chain of authority back to some root authority 402 that is specified in license 306. Root authority is typically a server that is associated with the licensee of software 202, and that the manufacturer and/or licensor of software 202 has accepted as the legitimate issuer of certificates (or as the legitimate root of authority for some downstream issuer of certificates) for a licensee's installation of software 202. The manufacturer and/or licensor manifests this grant of legitimacy by naming root authority 402 in license 306, and then signing the license with the manufacturer's key. (Enforcement component 208 (shown in FIG. 2) has the built-in ability to verify the manufacturer's signature of the license. Root authority 402 is associated with a key pair 410, which is used to sign the identity certificates of servers that have been approved to issue certificates. In general, any authority that can trace its chain of authority back to the root authority 402 specified in a particular license 306 should be able to issue certificates that will be acceptable under license 306 (except in the case where some authority that is part of that chain of authority has been revoked—e.g., by use of the CRL mentioned above.) The mechanics of digital signatures, how those signatures can be used to establish authenticity, and how authority can be established through a chain of trust, are generally known in the relevant art.

Enterprise license server 404 is typically associated with a particular entity 430 (where the "entity" is, for example, an enterprise such as a corporation); enterprise license server typically issues certificates for computers within entity 430. Enterprise license server 404 has an associated identity certificate 412 and a license server key pair 414. In one example, the public portion of key pair 414 may be the identity certificate 412, although the embodiment described herein is not limited to the example where such is the case. Root authority 402 may digitally sign enterprise license server 404's identity certificate 412 as a representation that root authority 402 has authorized enterprise license server 404 to issue the certificates called for by license 306.

Computers 406 and 408 may each engage in an enrollment transaction with enterprise license server 404. That is, computers 406 and 408 communicate with enterprise license server 404 and, typically, establish their right to receive a certificate. Enterprise license server 404 may impose certain requirements on computers 406 and 408 before granting the appropriate certificates.

Enterprise license server 404 issues certificates to computers 406 and 408. In the example described herein, enterprise license server 404 issues certificate 420 to computer 406, and issues certificate 422 to computer 408. (Certificates 420 and 422 may be instances of certificate 308, shown in FIG. 3.) The actual data contained in the certificate may be different for each computer. For example, each certificate may contain a sequence number that is different for each instance of the certificate. As another example, each certificate may contain the hardware parameters of the machine for that certificate has been prepared, thereby binding the certificate to a particular machine. (The enforcement component 208 (shown in FIG. 2) may examine the hardware parameters contained in a certificate and compare those parameters to the machine on which enforcement component 208 is running, and the results of this comparison may be used in determining whether enable certain software features.)

It should be noted at this juncture that it is advantageous, although not necessary, for enterprise license server 404 to be the certificate authority for an enterprise's actual domain, where the certificate authority is the server that grants computers the right to participate in the domain of a particular organization. Moreover, it is advantageous for the certificate called for by license 306 to be the certificate that grants a computer membership in the organization's domain. By linking the right to execute a particular piece of software 202 (which is effectively granted by issuing a particular certificate) with the right to participate in an organization's domain (which may be effectively granted by way of the same certificate that authorizes the use of software 202), the enterprise has a built-in incentive to control tightly the use of the software 202 for which its certificate authority acts as the license server. In particular, if the certificate called for in license 306 is the same certificate that entitles a computer to participate in an enterprise's domain, then the enterprise has a built-in disincentive to license use of software 202 to people outside of the enterprise, since granting such people the required certificate would also give those people access to the enterprise's domain. While it is therefore advantageous for the certificate authority and the license server to be one and the same, it is possible to authorize any arbitrary server to act as a license server.

In one example, enterprise license server 404 may have the capability to revoke certificates that have been issued. To the extent that such a certificate is required to enable the software (or certain features thereof), revocation of a certificate effectively revokes use of the software (or of certain features of the software).

Figure 5:
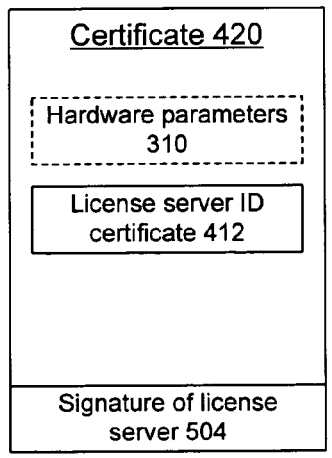
FIG. 5 is a block diagram of an example certificate.

FIG. 5 shows an example of a certificate. In the example of FIG. 5, certificate 420 is shown, although the description of certificate 420 may apply equally to other certificates, such as certificate 422 (shown in FIG. 4). Certificate 420 comprises the identity certificate 412 of the license server that issued certificate 420.

Certificate 420 may also contain hardware parameters 310 relating to the machine to which certificate 420 has been issued. As noted above, an enforcement component 208 may use the hardware parameters 310 contained in the certificate to determine whether the certificate is actually installed on the machine for which it was intended, and such determination may be used as part of the decision to enable or disable software features.

Certificate 420 also contains a signature 504 of the license server that issued the certificate. The signature can be used to verify that the certificate was actually issued by the license server that it purports to have been issued by, and such determination may be used by enforcement component 208 as part of the decision to enable or disable software features. Certificate 420 may also contain data other than what is shown, such as the sequence number mentioned above.

Software Distribution and Licensing Process

Figure 6:
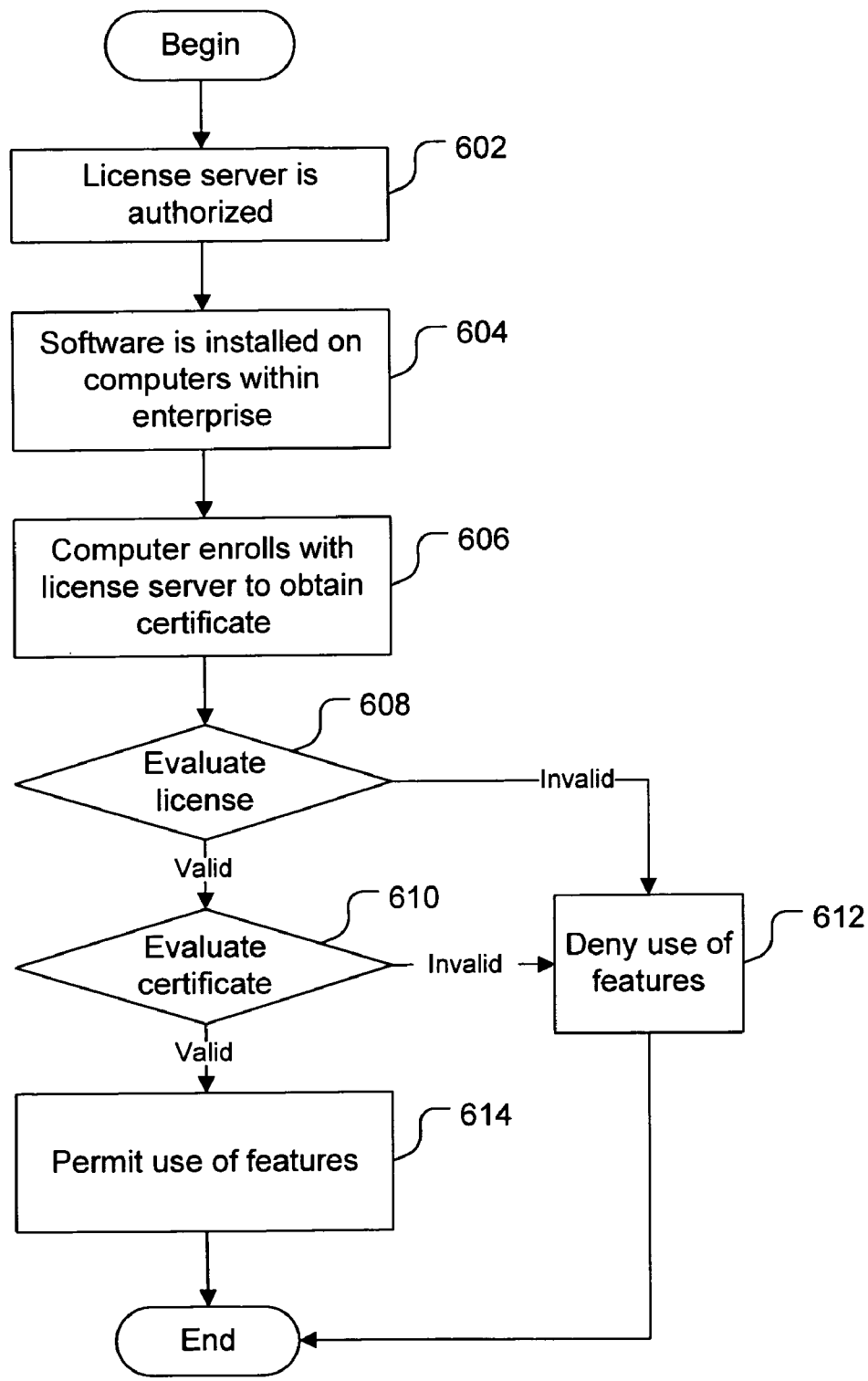
FIG. 6 is a flow diagram of an example process of deploying software.

FIG. 6 shows an example process that may be used for distributing and licensing software.

At 602, a license server is authorized to issue certificates. As described above, a license may require the presence of a certificate signed by an authorized license server, and such authorization is given at 602. The authorization is typically given by a root authority (e.g., the server that the manufacturer and/or licensor of the software has recognized as the legitimate authority of the licensee, which is manifested by the manufacturer's and/or licensor's recognition of that root authority in the license), and the root authority may impose certain requirements prior to authorizing a given license server to issue certificates for a piece of software. The root authority normally manifests its grant of authority by signing the identity certificate of the license server. As previously noted, the identity certificate of a license server may, optionally, be or include the public key that the license server will use to sign certificates. Typically, the license server is associated with an enterprise, such as a corporation.

At 604, instances of the software to be licensed are installed on one or more computers within an enterprise, along with a license that calls for a certificate that can trace its chain of authority back to the enterprise's root authority (such as a certificate issued by the license server that was authorized at 602 above). Additionally, instances of an enforcement component are installed on these computers. (The enforcement component may, optionally, be part of the software that is being licensed, or may, optionally, be distributed with that software.) In one example, the manufacturer and/or licensor of the software provides the enterprise/licensee with a master disk (or disks) that contains the software, an enforcement component, and a license, and this disk (or disks) may be used to install the software, enforcement component, and license on the computers. However, the software, enforcement component, and license may be distributed to the computers by other means—e.g., by download over a network.

At 606, one or more computers in the enterprise enroll with the license server to receive certificates. It should be noted that the enrollment does not necessarily take place subsequent to the time at which the software to be licensed is installed on the computer. For example, the enrollment may have taken place at some point in the past, and the certificate called for in the license may simply be the domain certificate that has already been issued to the computer as a result of a past enrollment. Assuming that the computer is qualified to enroll, the license server issues a certificate. What makes a computer "qualified" to enroll depends on the policies that govern the license server; as one example, a computer must be associated with an employee of a company before that company's license server will issue a certificate to that computer. As noted above, each certificate issued as part of the enrollment process may be specific to the computer on which the certificate is to be installed. For example, each certificate may contain information about the hardware parameters of the computer on which the certificate is to be installed, and may also contain a sequence number.

At 608, the enforcement component evaluates the license, where the evaluation may include a number of aspects. For example, the manufacturer and/or licensor of the software to which the license applies may have signed the license, and the enforcement component may use the manufacturer's and/or licensor's public key to validate a signature on the license. Additionally, the evaluation of the license may include a determination of what, if any, certificates are required to use the software. For example, at the time of license evaluation, the enforcement component may read the license and determine that use of full-featured mode of the software requires a certificate issued by the license server that was authorized at 602 above. It should be noted that the evaluation of the license is not limited to any specific time during execution of the software. In one example, evaluation of the license occurs at the time the software is started; in another example (e.g., in the case where the software being licensed is an operating system that provides the opportunity for a user to log in), the evaluation of the license may take place at the time of login. In yet another example, the evaluation may take place after the software (or even the feature of the software whose operation is enabled and/or disabled by the enforcement component) has already started running.

If the license is determined not to be valid, the use of certain (or all) software features is denied at 612. On the other hand, if the license is determined to be valid, then a certificate called for in the license is evaluated at 610.

In order to validate the certificate, the enforcement component validates the signature on the certificate. As part of the license evaluation process at 608, the enforcement component became apprised of the identity of the root authority that a particular certificate must be able to trace its chain of authority back to in order for that certificate to authorize enablement of the software (or certain features thereof). The enforcement component, therefore, builds the chain of authority back to the root and compares the root of the chain to the root authority named in the license. Additionally, as part of the certificate validation process, the enforcement component may read the hardware parameters, if any, contained in the certificate, and compare these hardware parameters with those of the machine on which the licensed software and enforcement component are running. If the certificate fails any of the validation tests, then use of the software (or certain features thereof) is denied at 612. Otherwise, the use of the software (or certain features thereof) is permitted at 614.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of distributing software to an entity and controlling the software usage based on authorized issuance of certificate comprising:
    authorizing the entity to issue a certificate to each of one or more machines belonging to the entity;
    providing the software to the entity, said entity having a right to install an instance of the software on each of the one or more machines and the right to issue a certificate to each of the one or more machines;
    installing said instance of the software on each of the one or more machines to provide for an installed instance of the software;
    issuing, by a license server of the entity, to the at least one or more machines the certificate;
    receiving and installing the issued certificate at the at least one or more machines;
    transmitting, by the license server, to each of the one or more machines a license, wherein the license includes certificate requirements;
    receiving, by each of the one or more machines, the transmitted license;
    determining, by an enforcement component at each of the one or more machines, based on the certificate requirements included in the license whether said certificate is installed on said one or more machines;
    determining, by the enforcement component, whether the certificate complies with the requirements by tracing a chain of authority back to the license server; and
    based on the determinations performed by the enforcement component, executing said installed instance of the software on said one or more machines in a first mode of usage or in a second mode of usage, wherein the first and second mode of usage are either limited-features usage or full-features usage, wherein said second mode of usage is one of a plurality of modes different from said first mode of usage.

2. The method of claim 1, wherein said authorizing comprises including in said license, by a manufacturer or a licensor of the software, an identity of said license server, or of a server to which said license server traces authority, said license including a signature of said manufacturer or said licensor, wherein the software comprises or is associated with the enforcement component that determines whether said signature is an authentic signature of said manufacturer or licensor, and wherein a condition of permitting said first mode of usage of the software on said one or more machines is that said certificate be determined by the enforcement component to have been signed by the server whose identity is included in said license, or by a server that traces authority to the server whose identity is included in said license.

3. The method of claim 1, wherein said certificate identifies said one of said machines, and wherein said license conditionally permits said first mode of usage of said installed instance of the software is further based on whether a comparison between (a) the one or more machines on which said installed instance of the software is running, and (b) said certificate, satisfies a condition, said condition being either: that the one or more machines identified in said certificate is the same as the one or more machines on which said installed instance of the software is running; or that the difference between the one or more machines identified in said certificate and the one or more machines on which said installed instance of the software is running is within a defined limit of tolerance.

4. The method of claim 1, further comprising: providing to said entity one or more media on which the software and said license are stored.

5. The method of claim 4, further comprising storing said certificate on a removable medium.

6. The method of claim 1, wherein usage of said installed instance of the software in said second mode prevents usage of at least one feature of the software that would be usable when said installed instance of the software is used in said first mode.

7. A computer storage medium having stored thereon computer executable instructions for distributing software to an entity and controlling the software usage based on authorized issuance of certificate, the computer executable instructions when executed by one or more processors cause the one or more processors to perform the steps comprising:
    authorizing the entity to issue a certificate to each of one or more machines belonging to the entity;
    providing the software to the entity, said entity having a right to install an instance of the software on each of the one or more machines and the right to issue a certificate to each of the one or more machines;
    installing said instance of the software on each of the one or more machines to provide for an installed instance of the software;
    issuing, by a license server of the entity, to the at least one or more machines the certificate;
    receiving and installing the issued certificate at the at least one or more machines;
    transmitting, by the license server, to each of the one or more machines a license, wherein the license includes certificate requirements;
    receiving, by each of the one or more machines, the transmitted license;

determining, by an enforcement component at each of the one or more machines, based on the certificate requirements included in the license whether said certificate is installed on said one or more machines;

determining, by the enforcement component, whether the certificate complies with the requirements by tracing a chain of authority back to the license server; and based on the determinations performed by the enforcement component, executing said installed instance of the software on said one or more machines in a first mode of usage or in a second mode of usage, wherein the first and second mode of usage are either limited-features usage or full-features usage, wherein said second mode of usage is one of a plurality of modes different from said first mode of usage.

8. The computer storage medium of claim 7, wherein said authorizing comprises including in said license, by a manufacturer or a licensor of the software, an identity of said license server, or of a server to which said license server traces authority, said license including a signature of said manufacturer or said licensor, wherein the software comprises or is associated with the enforcement component that determines whether said signature is an authentic signature of said manufacturer or licensor, and wherein a condition of permitting said first mode of usage of the software on said one or more machines is that said certificate be determined by the enforcement component to have been signed by the server whose identity is included in said license, or by a server that traces authority to the server whose identity is included in said license.

9. The computer storage medium of claim 7, wherein said certificate identifies said one of said machines, and wherein said license conditionally permits said first mode of usage of said installed instance of the software is further based on whether a comparison between (a) the one or more machines on which said installed instance of the software is running, and (b) said certificate, satisfies a condition, said condition being either: that the one or more machines identified in said certificate is the same as the one or more machines on which said installed instance of the software is running; or that the difference between the one or more machines identified in said certificate and the one or more machines on which said installed instance of the software is running is within a defined limit of tolerance.

10. The computer storage medium of claim 7, wherein the method further comprises: providing to said entity one or more media on which the software and said license are stored.

11. The computer storage medium of claim 10, wherein the method further comprises: storing said certificate on a removable medium.

12. The computer storage medium of claim 7, wherein usage of said installed instance of the software in said second mode prevents usage of at least one feature of the software that would be usable when said installed instance of the software is used in said first mode.

13. A system for distributing software to an entity and controlling the software usage based on authorized issuance of certificate comprising:

means for authorizing the entity to issue a certificate to each of one or more machines belonging to the entity;

means for providing the software to the entity, said entity having a right to install an instance of the software on each of the one or more machines and the right to issue a certificate to each of the one or more machines;

means for installing said instance of the software on each of the one or more machines to provide for an installed instance of the software;

means for issuing to the at least one or more machines the certificate;

means for receiving and installing the issued certificate at the at least one or more machines;

means for transmitting a license to each of the one or more machines, wherein the license includes certificate requirements;

means for receiving the transmitted license;

means for determining, based on the certificate requirements included in the license, whether said certificate is installed on said one or more machines;

means for determining whether the certificate complies with the requirements by tracing a chain of authority back to the license server; and means for executing said installed instance of the software on said one or more machines in a first mode of usage or in a second mode of usage based on the determinations, wherein the first and second mode of usage are either limited-features usage or full-features usage, wherein said second mode of usage is one of a plurality of modes different from said first mode of usage.

14. The system of claim 13, wherein said authorizing comprises including in said license, by a manufacturer or a licensor of the software, an identity of said license server, or of a server to which said license server traces authority, said license including a signature of said manufacturer or said licensor, wherein the software comprises or is associated with the enforcement component that determines whether said signature is an authentic signature of said manufacturer or licensor, and wherein a condition of permitting said first mode of usage of the software on said one or more machines is that said certificate be determined by the enforcement component to have been signed by the server whose identity is included in said license, or by a server that traces authority to the server whose identity is included in said license.

15. The system of claim 13, wherein said certificate identifies said one of said machines, and wherein said license conditionally permits said first mode of usage of said installed instance of the software is further based on whether a comparison between (a) the one or more machines on which said installed instance of the software is running, and (b) said certificate, satisfies a condition, said condition being either: that the one or more machines identified in said certificate is the same as the one or more machines on which said installed instance of the software is running; or that the difference between the one or more machines identified in said certificate and the one or more machines on which said installed instance of the software is running is within a defined limit of tolerance.

16. The system of claim 13, wherein the system further comprises: means for providing to said entity one or more media on which the software and said license are stored.

17. The system of claim 16, wherein the system further comprises: means for storing said certificate on a removable medium.

18. The system of claim 13, wherein usage of said installed instance of the software in said second mode prevents usage of at least one feature of the software that would be usable when said installed instance of the software is used in said first mode.

* * * * *